April 3, 1962 F. J. POKORNY ET AL 3,028,527
ANTI-PUMP CONTROL CIRCUIT FOR MOTOR CLOSED CIRCUIT BREAKER
Filed March 17, 1958 3 Sheets-Sheet 1

INVENTORS
FRANK J. POKORNY
CHALLISS I. CLAUSING
BY
OSTROLENK, FABER, GERB & SOFFEN
ATTORNEYS

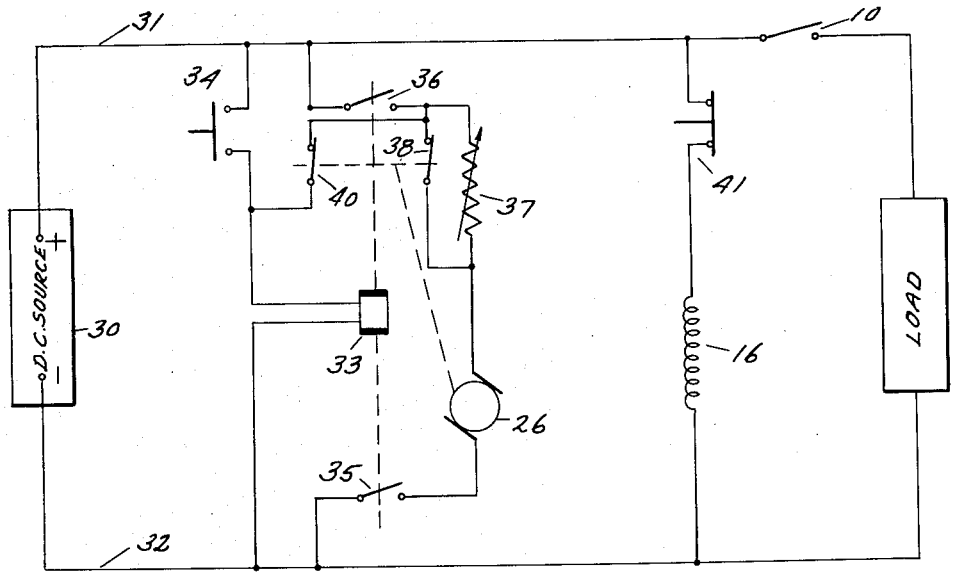
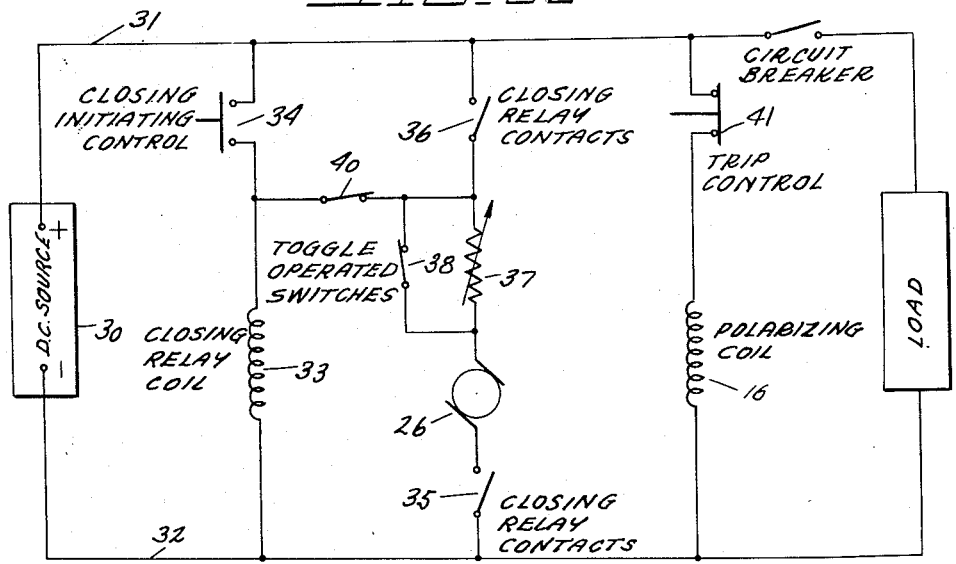

April 3, 1962  F. J. POKORNY ET AL  3,028,527
ANTI-PUMP CONTROL CIRCUIT FOR MOTOR CLOSED CIRCUIT BREAKER
Filed March 17, 1958  3 Sheets-Sheet 3

INVENTORS
FRANK J. POKORNY
CHALLISS I. CLAUSING
BY
ATTORNEYS

United States Patent Office 3,028,527
Patented Apr. 3, 1962

3,028,527
ANTI-PUMP CONTROL CIRCUIT FOR MOTOR
CLOSED CIRCUIT BREAKER
Frank J. Pokorny, Hatboro, Pa., and Challiss I. Clausing, Collingswood, N.J., assignors to I-T-E Circuit Breaker Company, Philadelphia, Pa., a corporation of Pennsylvania
Filed Mar. 17, 1958, Ser. No. 721,971
8 Claims. (Cl. 317—54)

The instant invention relates to an electric closing circuit for circuit breakers which have extremely fast opening characteristics and which are closed by motor operation.

In our copending application Serial No. 660,982, filed May 22, 1957, now Patent No. 2,939,930, assigned to the assignee of the instant invention and entitled, "Motor Closing Mechanism for Circuit Breakers," there is described a high speed circuit breaker and a motor closing mechanism therefor. The circuit breaker includes an over-center toggle system which is utilized as the output of the motor mechanism, this toggle system forming a latch for the circuit breaker contacts when they are driven to their engaged position. In prior art closing arrangements the motor is allowed to coast after its de-energization, resulting in a tendency of the toggle mechanism to rebound after reaching the intended stop position and on occasion the toggle mechanism has been known to rebound passed dead center resulting in a highly undesirable slow opening operation of the circuit breaker contacts.

The instant invention provides a control arrangement whereby resistance is inserted in series with the closing motor when the toggle mechanism passes over center causing the motor to stall in the closed position of the circuit breaker with approximately 1/10 normal voltage on the motor. The reduced voltage together with the inertia of the moving parts insures that the toggle will remain over center against its stop without rebounding. During closing, the circuit breaker movable contact may operate independently of the toggle linkage through a trip free mechanism and after trip free operation the toggle linkage is reset with a time delay which is provided by the resistance of the closing motor and the output gearing which provides the operative connection between the motor and the toggle mechanism. Once the mechanism is reset energization of the motor will once again achieve a closing operation of the circuit breaker.

Briefly, the circuit arrangement of the instant invention includes a control relay which is energized by the closing initiating switch and when so energized closes a first and a second pair of cooperating contacts which energize the closing motor and at the same time bypass the closing initiating switch thus sealing the relay in the circuit through its own contact. When the toggle mechanism reaches its over center position, a third pair of contacts instantaneously opens thereby placing a resistance in series with the motor so that the torque thereof is substantially reduced. A four pair of normally closed contacts, having delayed opening characteristics, are also operated by the passing of the toggle mechanism over the center position. The fourth pair of contacts is connected in series between the control relay and the first pair of contacts thereby enabling the first pair of contacts to by-pass the closing initiating switch. However, when the fourth pair of contacts open the energizing circuit to the control relay the first pair of contacts will be opened so that the first pair of now open contacts thereby interrupts the energizing circuit to the motor.

Instantaneous trip control is provided by a normally closed switch which is connected in series between the polarizing coil of the magnetic latch and its energizing source.

Accordingly, a primary object of the instant invention is to provide a novel anti-pump control scheme for a high speed motor operated circuit breaker.

Another object is to provide a novel anti-pump control arrangement which requires fewer components than control arrangements of the prior art.

Still another object is to provide a novel anti-pump control arrangement which insures but a single closing attempt per operation of the closing control switch.

A further object is to provide a novel anti-pump control arrangement which includes a sealing in control so that the circuit breaker closes independently of the closing control switch.

A still further object is to provide a novel anti-pump control arrangement which achieves positive over-center positioning of the circuit breaker operating toggle mechanism without the danger of rebounding.

These as well as other objects of the instant invention shall become readily apparent after reading the following description of the accompanying drawings in which:

FIGURE 2A is a wiring diagram of our novel anti-pump control arrangement.

FIGURE 2B is a simplified wiring schematic diagram of the circuit illustrated in FIGURE 1.

Figure 3:
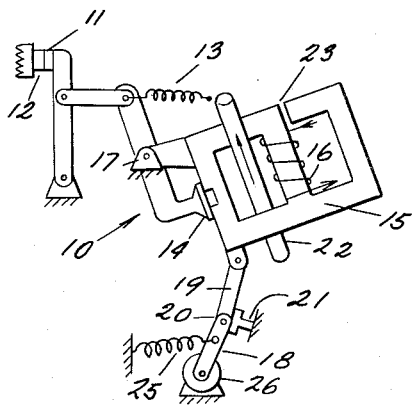
Figure 4:
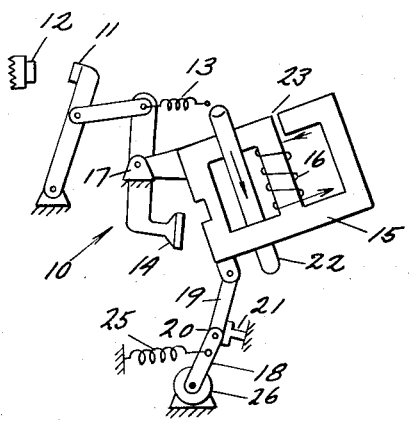
Figure 5:
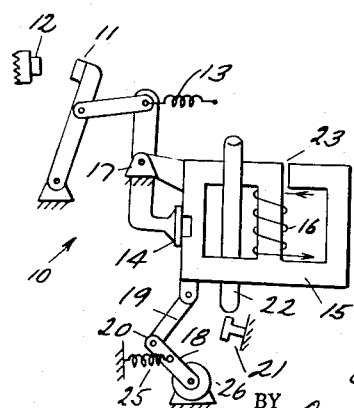

FIGURES 3, 4 and 5 are schematic diagrams illustrating a circuit breaker which is to be operated by our novel anti-pump control arrangement. In FIGURE 3 the circuit breaker is closed. In FIGURE 4 the circuit breaker is tripped open. In FIGURE 5 the circuit breaker is reset.

Referring to the figures, FIGURES 3–5 illustrate schematically the circuit breaker mechanism fully described in our aforesaid application Serial No. 660,982. Since this circuit breaker mechanism merely serves as a setting for our invention, the following description of the mechanism has been reduced to the bare essentials.

In FIGURE 3 the high speed circuit breaker 10 is closed, with movable contact 11 being in engagement with stationary contact 12. Spring 13 exerts a direct acting opening force but the breaker 10 is held closed by the magnetic latch comprising armature 14 which is secured to magnet 15 by a flux generated by polarizing coil 16. The magnet structure 15, which is otherwise free to pivot about point 17, is now held by the overcenter toggle, comprising links 18, 19 whose knee 20 bears against stop 21.

This toggle condition is maintained by the clockwise component of force produced by the opening spring 13 and transmitted through the armature 14 which is sealed to the magnet structure 15. In a breaker set for high speed reverse current trip the flux produced by a forward current in bucking bar 22 aids the flux produced by polarizing coil 16 and helps to hold armature 14 against the magnet 15. When the main current reverses, the bucking bar flux also reverses and reduces the flux through the armature 14 by shifting flux through air gap 23 into the alternate path. The armature 14 is now free and is parted from the magnet 15 by the opening spring 13 thus removing the force of spring 13 from the toggle 18, 19. After the breaker contacts 11, 12 open, tension spring 25 acts on link 18 to break the toggle 18, 19, 20 thereby allowing the magnet structure 15 to pivot downward about point 17. The breaker 10 is now in the fully open position as shown in FIGURE 5.

When the breaker 10 is set for high speed tripping on forward overcurrents, the polarity of polarizing coil 16 is reversed so the normal forward current in bucking bar 22 tends to diminish the total flux through the armature path. When the current in the breaker 10 and bucking bar 22 rises to a predetermined value, the armature flux is reduced to a value which allows the breaker 10 to open in the same manner as outlined above.

The closing operation begins by closing the control circuit to motor 26 which drives link 18 through a spring clutch (not shown) until the over-center toggle condition is re-established. When the knee 20 touches stop 21, the spring clutch disengages the motor 26 and the motor control circuit is opened by limit switch contacts operated by the toggle members 18, 19. During this closing operation, the armature 14 is sealed to the magnet 15 by the polarizing flux. If adverse conditions still exist on the main circuit, the breaker is free to trip (FIGURE 4) even though the motor 26 is driving the magnet structure 15 toward the closed position. Manual closing is performed by means of a removable handle (not shown) on the motor shaft. Thus, the circuit breaker is mechanically and electrically trip-free.

Figure 1:
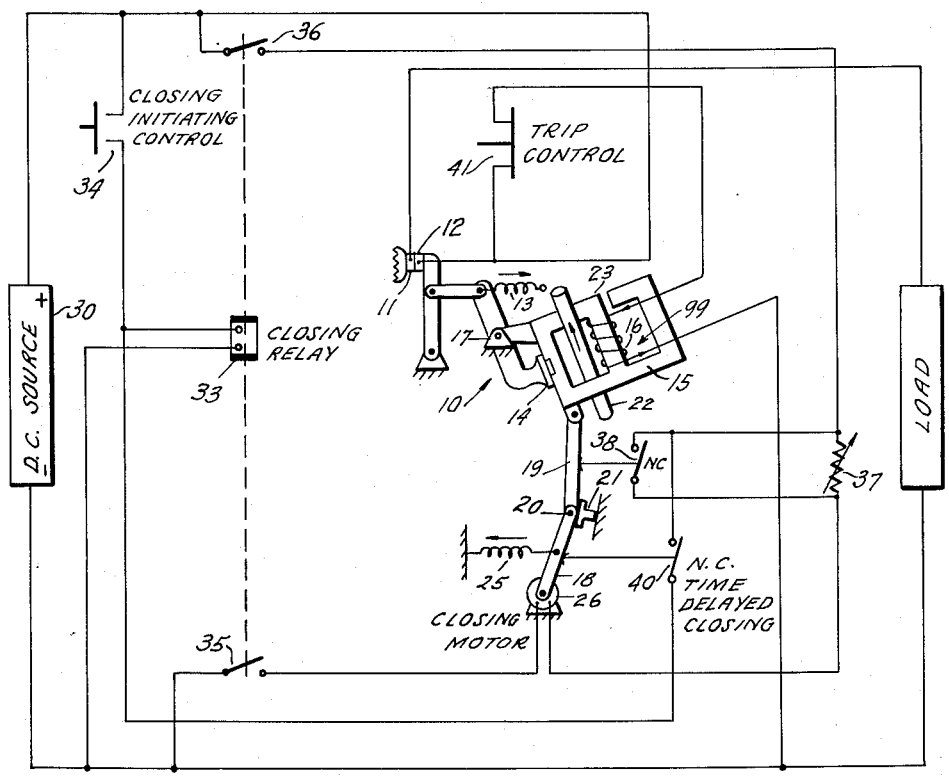
FIGURE 1 is a combined electrical and mechanical schematic of a circuit breaker having an anti-pump control arrangement constructed in accordance with the teachings of the instant invention.

Now referring more particularly to FIGURES 1 and 2, our novel anti-pump control scheme comprises three series paths connected in parallel across lines 31, 32 which are connected to the positive and negative terminals respectively of D.C. power source 30. The first series path comprises the closing relay coil 33 and normally open closing switch 34.

The second path comprises in order a first pair of normally open contacts 35, operating motor 26, a variable resistor 37, and a second pair of normally open contacts 36. A pair of normally closed contacts 38, associated with the toggle members 18, 19 is connected across resistor 37 and a pair of normally closed and slow to open contacts 40, also associated with the toggle members 18, 19 is connected between the junction of closing switch 34 and closing coil 33 and the junction of resistor 37 and contacts 36.

The third path comprises a series connection of the normally closed contacts of trip control 41 and polarizing coil 16 of the polarized trip latch means 99. Operation of trip control 41 interrupts the energizing circuit to polarizing coil 16 thereby reducing the flux in magnet structure 15 so that armature 14 is separated therefrom and cooperating contacts 11 and 12 are parted by spring 13. Thus circuit breaker 10 may be tripped regardless of the position of the operating mechanism therefor.

Closing of circuit breaker 10 from the reset position of FIGURE 5 is initiated by operating closing switch 34. This energizes coil 33 of the closing relay which closes the pairs of contacts 35, 36 in series with motor 26. Closed contacts 36 and normally closed contacts 40 provide an energizing path for coil 33 which is independent of closing switch 34.

Since resistor 37 is shorted by contacts 38 motor 26 is now connected directly to power source 30. Motor 26 begins to rotate and moves link 18 to the right thereby straightening toggle 18, 19 so that magnet 15 is rotated about point 17 causing movable contact 11 to approach stationary contact 12. When toggle 18, 19 goes over-center knee 20 engages stop 21 and contacts 38 are opened thereby placing resistor 37 in series with motor 26. This reduces the motor voltage to approximately 10% of normal as determined by the resistance value of variable resistor 37. The reduced voltage applied to motor 26 tending to move knee 20 against stop 21, together with the inertia of the moving parts, prevents any rebound of toggle 18, 19.

Contacts 40 may be ganged to contacts 38 but mechanically set to open a short time thereafter. Alternately contacts 40 may be operated open by a sequence arrangement. In any event, opening of contacts 40 follows the opening of contacts 38. Opening of contacts 40 interrupts the holding circuit for operating coil 33 which is thereby deenergized unless closing initiating switch 34 remains closed.

If breaker 10 closes on a fault or if for any reason magnetic latch 14, 15 releases during closing, breaker 10 trips independently of toggle 18, 19. Motor 26 continues to operate toggle 18, 19 to the over-center position of FIGURE 4. However, spring 25 cannot collapse toggle 18, 19 while closing switch 34 is closed since even the reduced voltage to motor 26 prevents a backward rotation thereof. This assures but a single closing attempt per operation of switch 34.

Even though control voltage source 30 is the same source being protected by circuit breaker 10, pumping will not result. If the voltage dips due to breaker 10 closing on a fault and interrupting a fault, a resetting action may start. However, there is a considerable intentional time delay in resetting the magnet 15 and voltage will be restored before armature 14 can be resealed or latched to magnet 15.

While our novel circuitry has been described utilizing a motor as the circuit breaker operating means, it should be readily understood that the principles of this invention may readily be utilized for solenoid operated circuit breakers. Further, it is possible that any combination of the three series paths may be energized from separate voltage sources. Assuming that the first and second series paths are operated from separate voltage sources, then contacts 40 are replaced by a dropout time delay which must be built into closing relay 33 so that a complete closing cycle would take place before relay dropout. In the alternative contact 40 may be isolated from the second series path and placed in series with a set of normally open contacts gauged to closing relay contacts 36. The series combination of contact 40 and the set of open contacts is connected across closing switch 34.

It is also to be understood that the source and/or control voltages may be either A.C. or D.C. However, if the voltage applied to the third series path is A.C. then a rectifier is required in series with polarizing coil 16.

Thus we have provided a novel anti-pump control arrangement which provides positive protection regardless of momentary control voltage dips. Our circuit results in the elimination of the relay holding coil associated with closing coils of prior art circuitry and further eliminates service. Advantages are gained in continuity of service and maintenance since control wiring is simplified and fewer parts result in a reduced likelihood of misoperation and failure.

Although we have here described preferred embodiment of our novel invention, many variations and modifications will now be apparent to those skilled in the art, and we therefore prefer to be limited, not by the specific disclosure herein, but only by the appending claims.

We claim:

1. An electrical control circuit for a motor closed high speed circuit breaker comprising a first and a second circuit connected in parallel; said first circuit including a normally open switch and a relay coil connected in electrical series; said second circuit including a first normally open contact and a circuit breaker closing means connected in electrical series; said closing means being constructed to provide motive power for physical movement of circuit breaker contacts; said first contact being closed by the energization of said relay coil; a second normally closed contact being electrically connected between said switch and said first contact; said first and said second contacts comprising a by-pass circuit for said switch; said circuit breaker including a toggle operating mechanism; said second normally closed contact being opened by operation of said toggle operating mechanism over-center as said circuit breaker is operated from an open to a closed position; said second circuit also including a resistor connected in electrical series with said circuit breaker closing means; a third normally closed contact connected in parallel with said resistor; said third contact also being operatively positioned to be opened by said mechanism when said mechanism is operated to a predetermined position as said circuit breaker is being closed.

2. An electrical control circuit for a motor closed high speed circuit breaker comprising a first and a second circuit connected in parallel; said first circuit including a normally open switch and a relay coil connected in electrical series; said second circuit including a first normally open contact and a circuit breaker closing motor connected in electrical series; said motor being adapted to provide motive power for physical movement of circuit breaker contacts; said first contact being closed by the energization of said relay coil; a second normally closed contact being electrically connected between said switch and said first contact; said first and said second contacts comprising a by-pass circuit for said switch; said circuit breaker including a toggle operating mechanism; said second contact being opened when said toggle operating mechanism is moved over-center as said circuit breaker is operated from an open to a closed position; said second circuit also including a resistor connected in electrical series with said motor; a third normally closed contact also being operatively positioned to be opened by said mechanism when said mechanism is operated to a predetermined position as said circuit breaker is being closed; said third contact being opened before said second contact is open.

3. An electrical control circuit for a motor closed high speed circuit breaker comprising a first and a second circuit connected in parallel; said first circuit including a normally open switch and a relay coil connected in electrical series; said second circuit including a first normally open contact and a circuit breaker closing motor connected in electrical series; said motor being adapted to provide motive power for physical movement of circuit breaker contacts; said first contact being closed by the energization of said relay coil; a second normally closed contact being electrically connected between said switch and said first contact; said first and said second contacts comprising a by-pass circuit for said switch; said circuit breaker including a toggle operating mechanism; said second contact being opened when said toggle operating mechanism is moved over-center as said circuit breaker is operated from an open to a closed position; said second circuit also including a resistor connected in electrical series with said motor; a third normally closed contact also being operatively positioned to be opened by said mechanism when said mechanism is operated to a predetermined position as said circuit breaker is being closed; said third contact being opened before said second contact is open; a third circuit connected in parallel with said first and said second circuit; said third circuit comprising a normally closed switch and a coil means connected in electrical series; said coil means being part of a trip means for said circuit breaker.

4. An electrical control circuit for a motor closed high speed circuit breaker comprising a first and a second circuit connected in parallel; said first circuit including a normally open switch and a relay coil connected in electrical series; said second circuit including a first normally open contact and a circuit breaker closing motor connected in electrical series; said motor being adapted to provide motive power for physical movement of circuit breaker contacts; said first contact being closed by the energization of said relay coil; a second normally closed contact being electrically connected between said switch and said first contact; said first and said second contacts comprising a by-pass circuit for said switch; said circuit breaker including a toggle operating mechanism; said second contact being opened when said toggle operating mechanism is moved over-center as said circuit breaker is operated from an open to a closed position; said second circuit also including a resistor connected in electrical series with said motor; a third normally closed contact also being operatively positioned to be opened by said mechanism when said mechanism is operated to a predetermined position as said circuit breaker is being closed; said third contact being opened before said second contact is open; a third circuit connected in parallel with said first and said second circuit; said third circuit comprising a normally closed switch and a coil means connected in electrical series; said coil means being part of a trip means for said circuit breaker; said control circuit being adapted for connection to the same electrical power source being protected by said circuit breaker.

5. An electrical control circuit for a motor closed high speed circuit breaker comprising a first and a second circuit connected in parallel; said first circuit including a normally open switch and a relay coil connected in electrical series; said second circuit including a first normally open contact and a circuit breaker closing motor connected in electrical series; said motor being adapted to provide motive power for physical movement of circuit breaker contacts; said first contact being closed by the energization of said relay coil; a second normally closed contact being electrically connected between said switch and said first contact; said first and said second contacts comprising a by-pass circuit for said switch; said circuit breaker including a toggle operating mechanism; said second contact being opened when said toggle operating mechanism is moved over-center as said circuit breaker is operated from an open to a closed position; said second circuit also including a resistor connected in electrical series with said motor; a third normally closed contact connected in parallel with said resistor; said third contact also being opened when said toggle operating mechanism is moved over-center as said circuit breaker is operated from said open to said closed positions.

6. An electrical control circuit for a motor closed high speed circuit breaker comprising a first and a second circuit connected in parallel; said first circuit including a normally open switch and a relay coil connected in electrical series; said second circuit including a first normally open contact and a circiut breaker closing motor connected in electrical series; said motor being adapted to provide motive power for physical movement of circuit breaker contacts; said first contact being closed by the energization of said relay coil; a second normally closed contact being electrically connected between said switch and said first contact; said first and said second contacts comprising a by-pass circuit for said switch; said circuit breaker including a toggle operating mechanism; said second contact being opened when said toggle operating mechanism is moved over-center as said circuit breaker is operated from an open to a closed position; said second circuit also including a resistor connected in electrical series with said motor; a third normally closed contact connected in parallel with said resistor; said third contact also being opened when toggle operating mechanism is moved over-center as said circuit breaker is operated from said open to said closed positions; said third contact being opened before said second contact is open.

7. An electrical control circuit for a motor closed high speed circuit breaker comprising a first and a second circuit connected in parallel; said first circuit including a normally open switch and a relay coil connected in electrical series; said second circuit including a first normally open contact and a circuit breaker closing motor connected in electrical series; said motor being adapted to provide motive power for physical movement of circuit breaker contacts; said first contact being closed by the energization of said relay coil; a second normally closed contact being electrically connected between said switch and said first contact; said first and said second contacts comprising a by-pass circuit for said switch; said circuit breaker including a toggle operating mechanism; said second contact being opened when said toggle operating mechanism is moved over center as said circuit breaker is operated from an open to a closed position; said second circuit also including a resistor connected in electrical series with said motor; a third normally closed contact connected in parallel with said resistor; said third contact also being opened when toggle operating mechanism is moved over center as said circuit breaker is operated from said open to said closed positions; said third contact being opened before said second contact is open; a third circuit connected in parallel with said first and said second circuit; said third circuit comprising a normally closed switch and a coil means connected in electrical series; said coil means being part of a polarized magnetic latch for said circuit breaker.

8. An electrical control circuit for a motor closed high speed circuit breaker comprising a first and a second circuit connected in parallel; said first circuit including a normally open switch and a relay coil connected in electrical series; said second circuit including a first normally open contact and a circuit breaker closing motor connected in electrical series; said motor being adapted to provide motive power for physical movement of circuit breaker contacts; said first contact being closed by the energization of said relay coil; a second normally closed contact being electrically connected between said switch and said first contact; said first and said second contacts comprising a by-pass circuit for said switch; said circuit breaker including a toggle operating mechanism; said second contact being opened when said toggle operating mechanism is moved over-center as said circuit breaker is operated from an open to a closed position; said second circuit also including a resistor connected in electrical series with said motor; a third normally closed contact connected in parallel with said resistor; said third contact also being opened when toggle operating mechanism is moved over-center as said circuit breaker is operated from said open to said closed positions; said third contact being opened before said second contact is open; a third circuit connected in parallel with said first and said second circuit; said third circuit comprising a normally closed switch and a coil means connected in electrical series; said coil means being part of a polarized magnetic latch for said circuit breaker; said control circuit being adapted for connection to the same electrical power source being protected by said circuit breaker.

References Cited in the file of this patent
UNITED STATES PATENTS

| | | |
|---|---|---|
| 1,781,561 | Walle | Nov. 11, 1930 |
| 2,255,475 | Strauss | Sept. 9, 1941 |
| 2,803,787 | Spicer | Aug. 20, 1957 |
| 2,842,720 | Huston | July 8, 1958 |
| 2,846,621 | Coggeshall | Aug. 5, 1958 |
| 2,861,223 | Seller | Nov. 18, 1958 |